United States Patent
Singh

(10) Patent No.: US 11,066,285 B2
(45) Date of Patent: Jul. 20, 2021

(54) DISPENSING APPARATUS FOR AGING AND STORING WINE IN FLEXIBLE CONTAINERS

(71) Applicant: Vijay Singh, Far Hills, NJ (US)

(72) Inventor: Vijay Singh, Far Hills, NJ (US)

( * ) Notice: Subject to any disclaimer, the term of this patent is extended or adjusted under 35 U.S.C. 154(b) by 0 days.

(21) Appl. No.: 16/253,849

(22) Filed: Jan. 22, 2019

(65) Prior Publication Data

US 2020/0231421 A1   Jul. 23, 2020

(51) Int. Cl.
| | | |
|---|---|---|
| *B67D 1/00* | (2006.01) | |
| *B67D 1/10* | (2006.01) | |
| *B67D 1/08* | (2006.01) | |

(52) U.S. Cl.
CPC ......... *B67D 1/0001* (2013.01); *B67D 1/0004* (2013.01); *B67D 1/0802* (2013.01); *B67D 1/10* (2013.01); *B67D 2001/0827* (2013.01)

(58) Field of Classification Search
CPC .. B67D 1/0001; B67D 1/0004; B67D 1/0802; B67D 1/10; B67D 2001/0827; B67D 1/0801; B67D 3/0064; B67D 2001/0824; Y10T 137/87957; B05B 15/30; B05B 15/33; B65D 1/323; B65D 83/32; B65D 223/004; B65D 2588/545; G01F 11/028; F17C 2223/045; F17C 2223/047; F17C 2225/045; F17C 2225/047
See application file for complete search history.

(56) References Cited

U.S. PATENT DOCUMENTS

| | | | | |
|---|---|---|---|---|
| 3,240,399 | A * | 3/1966 | Frandeen | B05B 11/047 222/211 |
| 4,137,930 | A * | 2/1979 | Scholle | F16L 37/04 137/614.03 |
| 4,564,132 | A * | 1/1986 | Lloyd-Davies | B65D 77/067 137/614.04 |
| 6,691,893 | B2 * | 2/2004 | Gauthier | A47K 5/1211 222/389 |
| 6,702,193 | B1 * | 3/2004 | Gates | A47G 21/18 239/16 |
| 9,802,805 | B2 * | 10/2017 | Singh | B67D 3/0038 |
| 2002/0088823 | A1 * | 7/2002 | Tabacchi | B67D 1/1206 222/52 |
| 2012/0187153 | A1 * | 7/2012 | Burge | B67D 1/0462 222/386.5 |

* cited by examiner

*Primary Examiner* — Vishal Pancholi
*Assistant Examiner* — Robert K Nichols, II
(74) *Attorney, Agent, or Firm* — Barnes & Thornburg LLP

(57) ABSTRACT

A system is provided for dispensing and storing liquid, such as wine. The system may include a dip tube coupled to a flexible bladder in an airtight manner. The dip tube may include a dip tube head and a perforated dip tube extension extending from the dip tube head into the contents of the flexible bladder.

12 Claims, 10 Drawing Sheets

DISPENSING APPARATUS FOR AGING AND STORING WINE IN FLEXIBLE CONTAINERS

FIELD

The presently disclosed embodiments relate generally to devices, systems, and methods of liquid storage and handling, in particular wine storage and handling.

BACKGROUND

Proper storage of oxygen-sensitive liquids such as fruit juices and wine has been a problem for hundreds of years. Containers currently used for storage range from plastic and wood barrels to metal tanks. When these oxygen-sensitive fluids are exposed to air, compounds in the fluid react with the oxygen in the air. These oxidized compounds substantially reduce and impair quality. In the manufacture, and especially storage of wine, there is a continual need to prevent contact with air and hence reduce oxidation. This problem is particularly difficult to prevent in the conventional rigid barrels and tanks that are typically used for storage and aging.

SUMMARY

In accordance with disclosed embodiments, bags can be manufactured using modern polymer materials that have low oxygen permeability.

In accordance with at least some disclosed embodiments, such bags may have a dip tube having a perforated dip tube extension that is configured to provide an inexpensive apparatus for the storage and aging of oxygen-sensitive fluids, such as wine, that overcomes all the aforementioned problems.

BRIEF DESCRIPTIONS OF THE DRAWINGS

The above description, as well as additional objects, features, and aspects of the disclosed embodiments, will be more fully appreciated by reference to the following detailed description, including the accompanying drawings.

The detailed description particularly refers to the accompanying figures in which.

DETAILED DESCRIPTION

Figure 1:
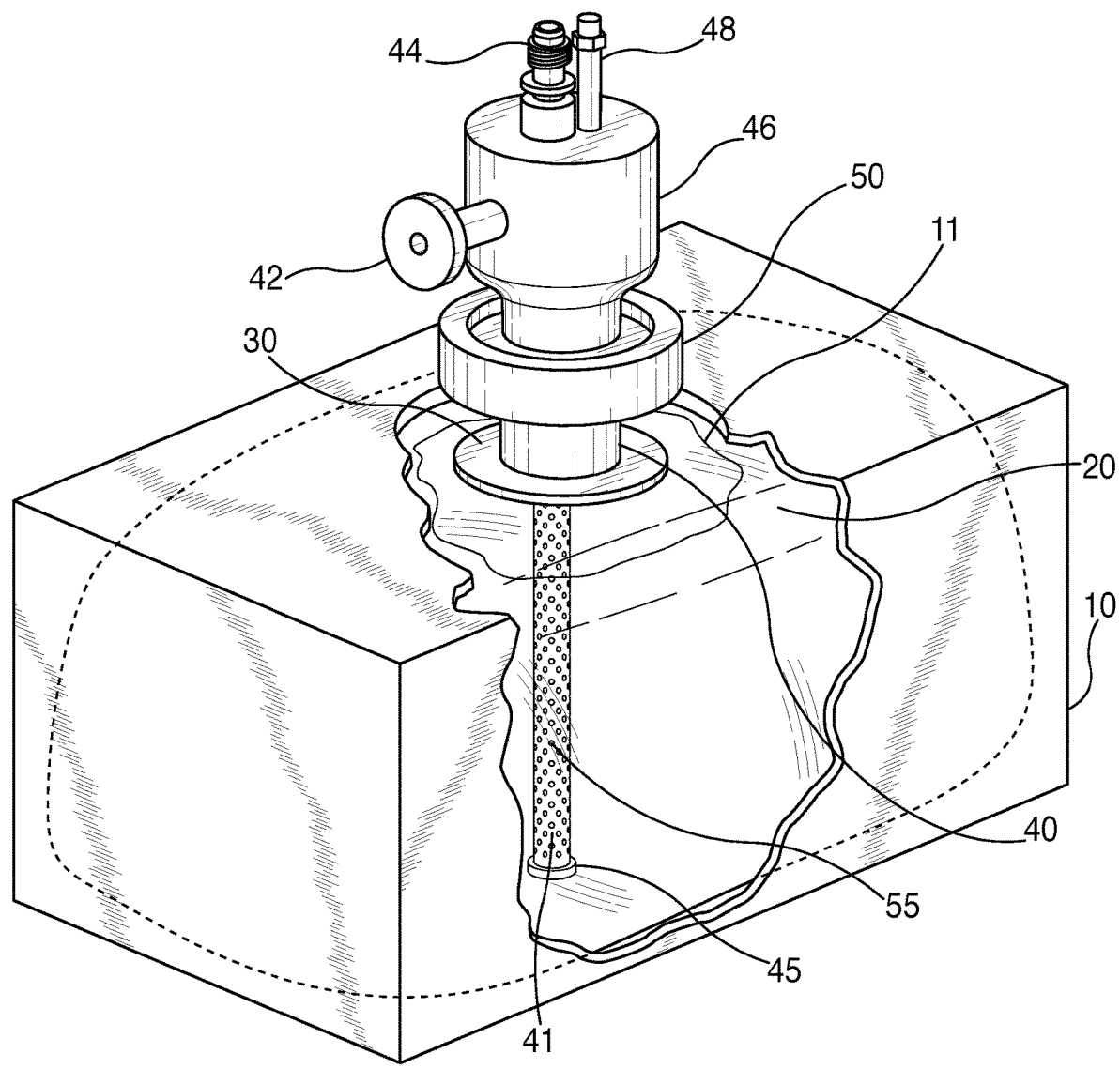
FIG. 1 is a perspective view of the disclosed embodiments illustrating the bladder placed within a rigid support container.

Due to sampling and evaporation, conventional containers for storage and aging of wine are often partially full and the residual air in the headspace of the barrel or tank reacts with the remaining stored wine degrading it. Enormous effort is spent in wineries worldwide "topping" off these containers with fresh wine to keep them full to the brim.

Moreover, conventional winemaking technology uses potassium metabisulfite to combat the oxidation of wine due to poor practices and archaic technology. Potassium metabisulfite is used to suppress oxidation caused by unavoidable contact with air inherent in traditional winemaking. The potassium metabisulfite neutralizes free oxygen that is introduced in the winemaking and aging process and helps keeps the wine fresher and last longer. However, the introduction of sulfite also results in a discernable sulfurous odor, and causes allergic reactions in many individuals. This has led to the requirement for a government warning about the sulfite content of wine to be posted on every bottle of wine.

Wooden barrels have the additional problem that they are porous, and air can diffuse into the wine through the wood. In addition to the quality reduction due to oxidation, contact with air can also cause contaminating bacteria to grow, making the wine sour and undrinkable. This can lead to major loss and wastage.

Wood barrels are expensive and must be cleaned and reused. Cleaning wood barrels is difficult and wasteful of water resources. Despite the best cleaning efforts contamination is common and the contaminated wine must be discarded. Use of flexible single-use storage bags eliminates this problem.

With at least one disclosed embodiment, oxygen is eliminated in the entire storage and aging process. This minimizes or can even eliminate the need to add sulfites to "stabilize" the wine, leading to a healthier and better quality product.

In accordance with disclosed embodiments, systems and methods are provided for storage and aging of oxygen-sensitive fluids, such as wine, that minimizes contact with air during all operations with minimal operating labor and the elimination of wine required for "topping" off. The system may provide a container and dispensing apparatus that minimizes washing and waste water generation, yet is sanitary and does not introduce any contaminants such as bacteria or fungi into the stored wine. The dispenser ensures that clarified wine is drawn from the storage container in manner such as not to introduce air. Finally, the apparatus may be configured to provide ease of use and economical operation.

Accordingly, at least some disclosed embodiments may provide a flexible bladder comprising of an inert polymeric film that has very low oxygen permeability. This flexible bladder is placed inside a rigid container. This rigid container only serves to support the bladder and can be of any shape-vertical cylinder, cubic box, or horizontal barrel/drum. The material of construction of the rigid container is not important as the wine is contained inside the flexible bladder and does not contact the rigid container.

The flexible bladder may have a dip tube that has five primary functions: 1) filling, 2) dispensing, 3) sampling, 4) venting gases, and 5) overpressure protection. The dip tube is inserted into the flexible bladder. It is cleaned and reused. The flexible bladder is only used a single time, and then discarded.

In operation involving a method of use of disclosed embodiments, a new empty flexible bladder may be placed inside the rigid container, and a special dip tube inserted through a top port on the bladder and secured to form an airtight seal. Wine may be pumped in through the fill/drain port of this dip tube until a small amount of wine is seen coming out of the one-way pressure relief valve. This may indicate that the bladder is full of wine and that no air is present in the bladder. Wine may then be freely removed when necessary by pumping out of the fill/drain port.

Unlike a barrel or tank, the bladder collapses as wine is withdrawn so there is no headspace where deleterious air could be introduced. Samples may be taken at any time by connecting a tube to the sample port and applying a vacuum. The dip tube extends to the bottom of the bladder. Its entire length is perforated. When the fluid is dispensed from a full bladder, the liquid is drawn through the perforations near the top. This is the most clarified wine. As the fluid is pumped out, the wine level drops and liquid is pumped from lower and lower perforations until finally, sedimented material is drawn, and the dispensing terminated. This enables the entire clarified contents to be pumped out without disturbing the settled sediments.

The bladder may be designed to be disposable and inexpensive. The single use bladder ensures cleanliness and avoids any cross-contamination. The dip tube is cleaned and reused.

In general, FDA materials approved for long term food contact may be used to form the components such as the bladder and dip tube. The bladder material must also be inert to ethanol (up to 20% v/v). Multi-ply metalized films are preferred because of their very low oxygen permeability. Accordingly, the flexible bladder may be placed inside a rigid container. Such a rigid container only serves to support the bladder and can be of any shape-vertical cylinder, cubic box, or horizontal barrel/drum. The material of construction of the rigid container is not important as the wine is contained inside the flexible bladder and does not contact the rigid container.

While flexible bags have been used for the storage of wine and similar fluids there is a problem of sedimentation. Solids in the wine tend to settle out during storage/aging and the clarified wine in the upper zone needs to be drawn out of the flexible bag without disturbing the settled sediment that is left behind and then discarded. Solving this problem is the major objective of this disclosure. Better methods for the storage of wine are essential because wine must often be stored for several years in order to develop characteristic flavors. It is essential during this aging process that the wine does not oxidize or spoil.

Thus, in accordance with the disclosed embodiments, systems and methods for storage and aging of wine may minimize contact with air during all operations with minimal operating labor and the elimination of wine required for "topping" off. Thus, the system provides a container that minimizes washing and waste water generation, yet is sanitary and does not introduce any contaminants such as bacteria or fungi into the stored wine. Finally, the apparatus must be easy to use and economical to operate.

Referring now to the drawings, wherein like reference numerals and characters represent like or corresponding parts and steps throughout each of the views, there is shown in FIG. 1 a perspective view of an embodiment showing a bladder 20 containing wine placed inside rigid container 10. The bladder 20 may have a port 30 to connect to dip tube 40 using clamp 50. Bladder 20 may be made of various suitable materials. The bladder should be flexible and not impart any flavors or color to the wine. Modern polymer materials have been developed that have low oxygen permeability.

Dip tube 40 may be inserted into port 30 on bladder 20 and secured using clamp 50. This connection must be air tight. Dip tube 40 may have a suitable length that forms a dip tube extension 41, which may extend to the bottom of container 10 and may be closed at the distal end by a solid cap 45. The entire length of the perforated dip tube extension 41 may be perforated 55. These perforations may be, for example, ⅛" (3 mm) in diameter. The dip tube extension 41 may be made of any suitable flexible or rigid material that is inert to the liquid, such as wine, being stored.

Figure 2:
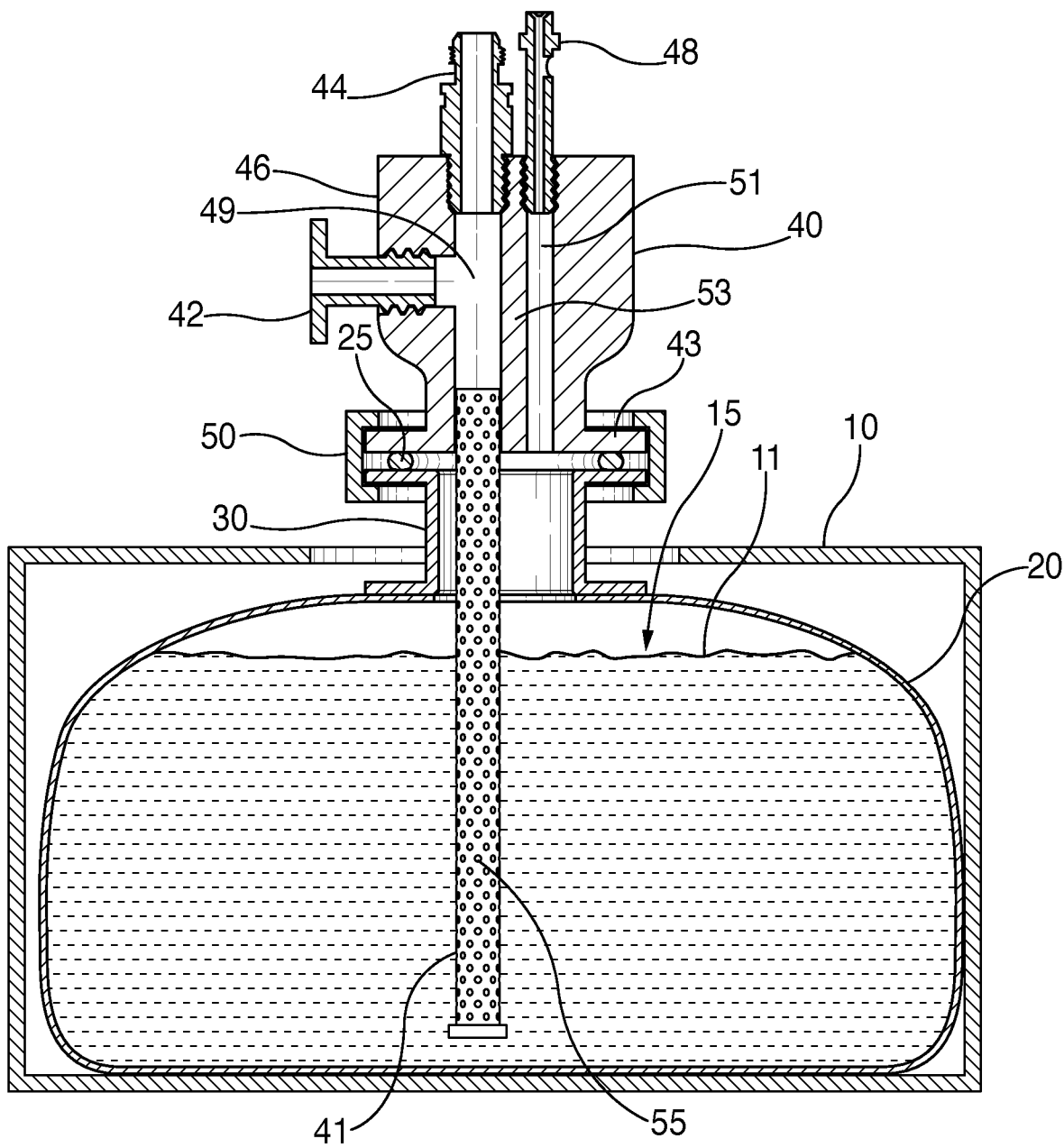
FIG. 2 is a side sectional view of the bladder and support container shown in FIG. 1.

Dip tube 40 may have a head component 46 that couples to the dip tube extension 41 and may form a plurality of openings forming ports as described further with respect to FIG. 2. Dip tube 40 may have a fill/drain port 42 to which a hose for filling and draining the bladder may be attached. Another port 44 may be provided on the top of head component 46 of dip tube 40. This port may be used for sampling the contents of bladder 20. It may also be used for venting any gas or air in the bladder by connecting to a vacuum source. A pressure relief valve 48 may also located on the top of dip tube 40. This may automatically vent any gases that may be generated inside bladder 20. This is a safety feature to prevent overpressure and potential rupture of bladder 20 due to gas build-up, or liquid overfill. Pressure relief valve 48 is typically set to vent when the pressure in the bladder exceeds 0.5 to 1.0 psig (3.4 to 6.9 Kpa).

As illustrated in FIG. 2, the flexible bladder 20 may be placed inside the rigid support container 10. The bladder may have a connection port, or mating connector 30. This is a molded plastic port that may be thermally welded to the bladder 20. Mating connector 30 may be connected at a proximal end to a flange 43 located on dip tube 40 by means of a clamp 50 and a gasket 25 creating a gas and liquid-tight connection.

Detail of the dip tube 40 is also shown in FIG. 2. In particular, the fill/drain port 42 is directly connected to the inside of the perforated dip tube extension 41 via chamber 49. Flow into and out of the flexible bladder 20 may be passed through this chamber 49 and forced through the perforations 55 of perforated dip tube extension 41. Chamber 49 is vented vertically through one-way sampling/vent valve 44. This allows any gases in the flexible bladder 20 to be evacuated by vacuum. It may also be used to sample the liquid contents by aspiration. The pressure relief valve 48 is channeled radially to the outside of the perforated dip tube extension 41 by way of a channel 51 separated from chamber 49 by wall 53 directly into the headspace 15. This design ensures that any overpressure in the flexible bladder is vented from the top of the bladder headspace 15, through pressure relief valve 48 to the environment.

Figure 3A:
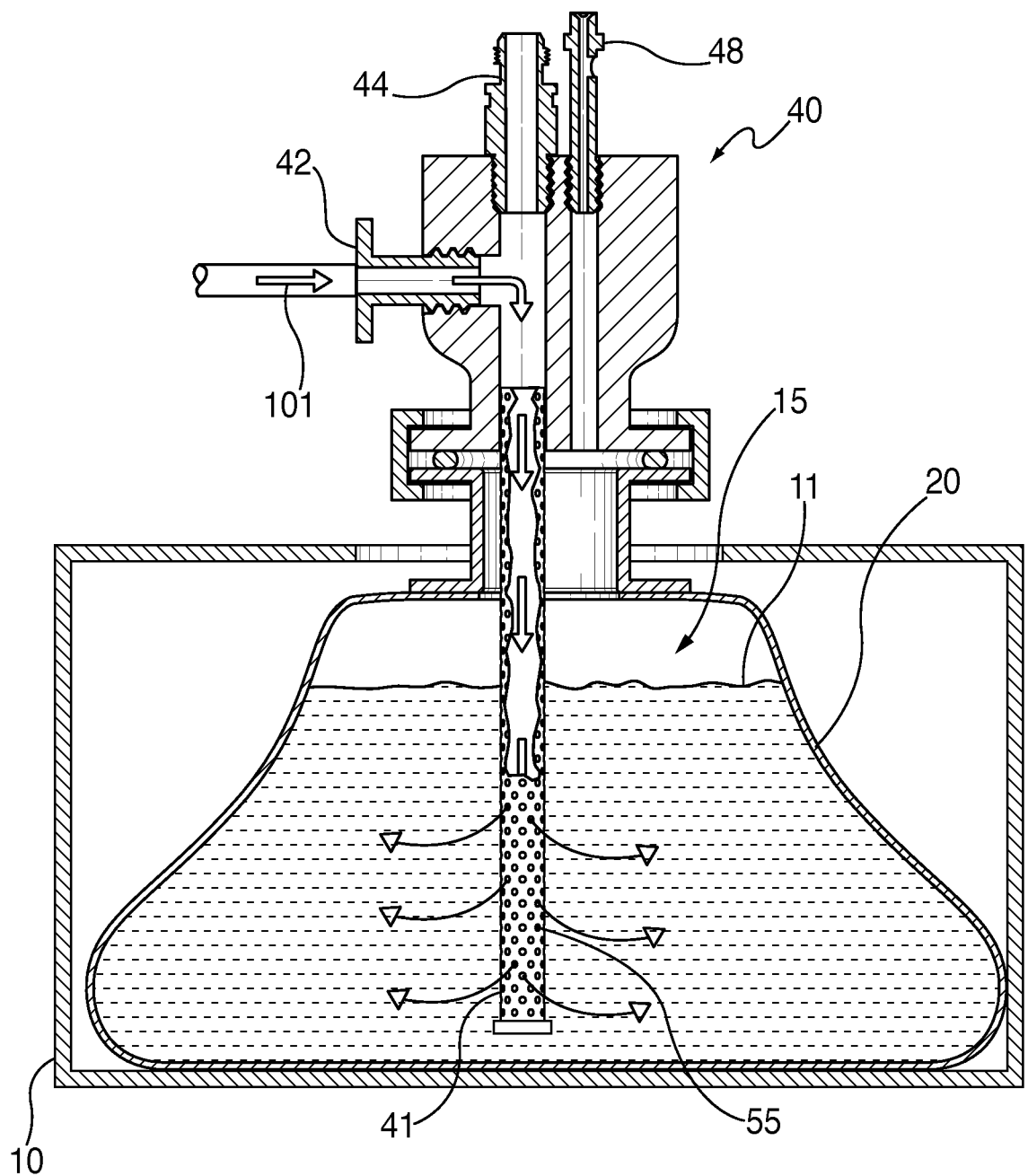
FIGS. 3A-3C are side sectional view showing the operation of the invention during filling in FIG. 3A and removal of wine in FIG. 3B, and FIG. 3C.

FIG. 3A shows how bladder 20 is filled with wine 101 through port 42. Port 42 must be open during filling or emptying and closed at all other times. This may be achieved using a quick-connect fitting or valve (not shown). As wine 11 enters dip tube 40 it is forced out through perforations 55 into the interior of bladder 20. As the bladder fills, the pressure builds up and any air inside the bladder is expelled through the pressure relief valve 48. The inlet of this relief valve (shown in FIG. 2.) is located outside the dip tube 40, but inside the headspace 15 of the bladder 20. This location ensures that liquid is not expelled until the bladder is completely full at which point liquid will escape out of the pressure relief valve 48. Filling may then be stopped.

In the case of a partially filled bladder, an aspirator (not shown) may be connected to the sampling/vent port 44 and a vacuum applied to remove any air from inside the bladder. Once liquid is detected coming out of the sampling/vent port 44 indicating that the bladder only contains liquid, the vacuum aspirator may be removed. A quick-connect fitting (not shown) on the sampling/vent port 44 ensures that the port closes when it is disconnected ensuring no air ingress into bladder 20.

During transfer operations, it is possible for air to get entrained into the wine. It is also possible for dissolved gases to come out of solution. In all these cases, using the vacuum aspiration technique as described earlier will serve to remove any air or gases from the bladder, leaving only wine in the bladder with no deleterious air-wine interface.

Figure 3B:
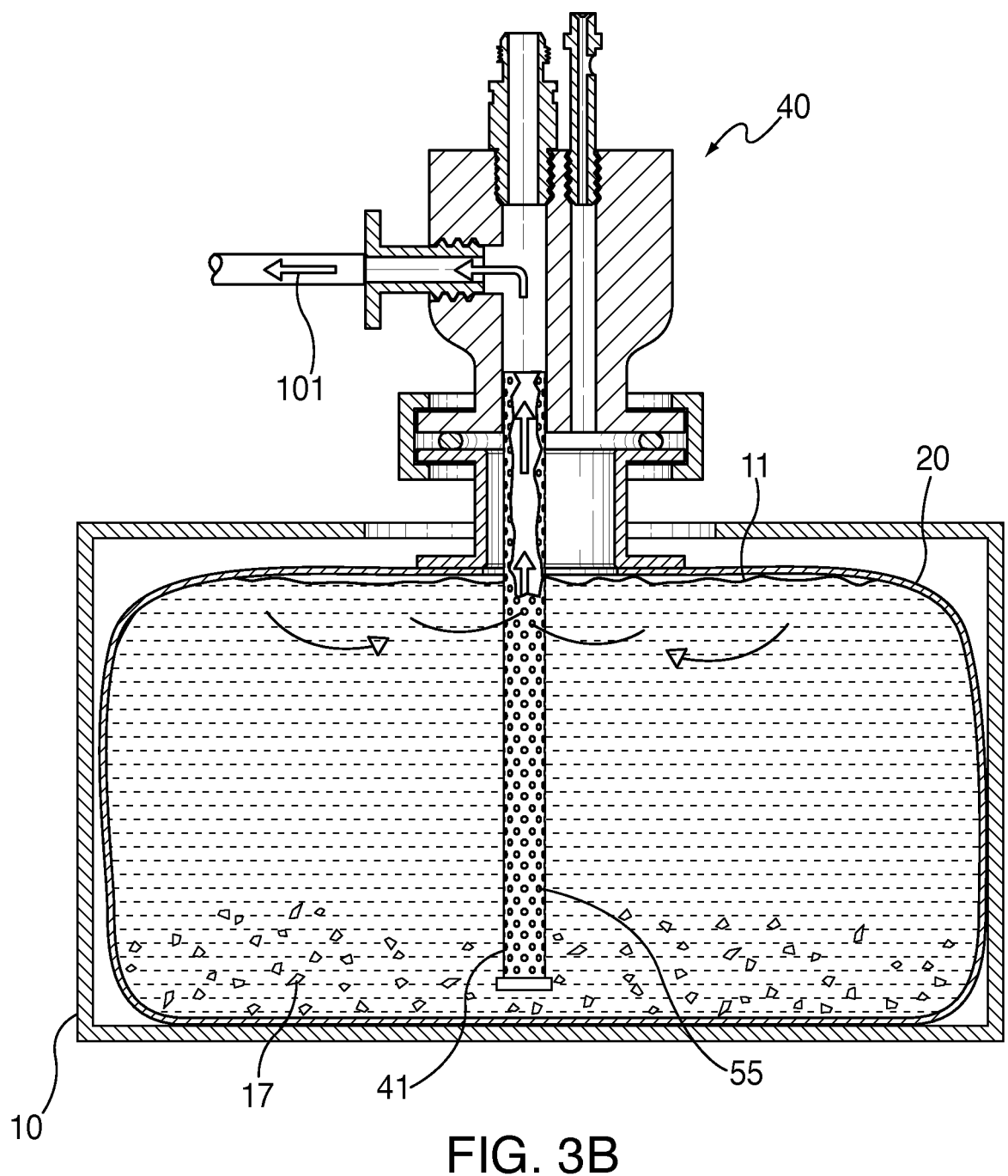

The operation of removing wine from the bladder is shown in FIG. 3B. A suitable hose may be connected to fill/drain port 42. Port 42 is then opened. As wine 101 is withdrawn using a pump, the bladder 20 will collapse on itself. In this manner no headspace is generated and no air is introduced to degrade the wine. The perforations 55 in dip tube extension 41 are vital to ensuring that settled sediments 17 are not disturbed. FIG. 3B shows how when the bladder 20 is full the wine is drawn from near the upper surface. This is the clearest wine.

Figure 3C:
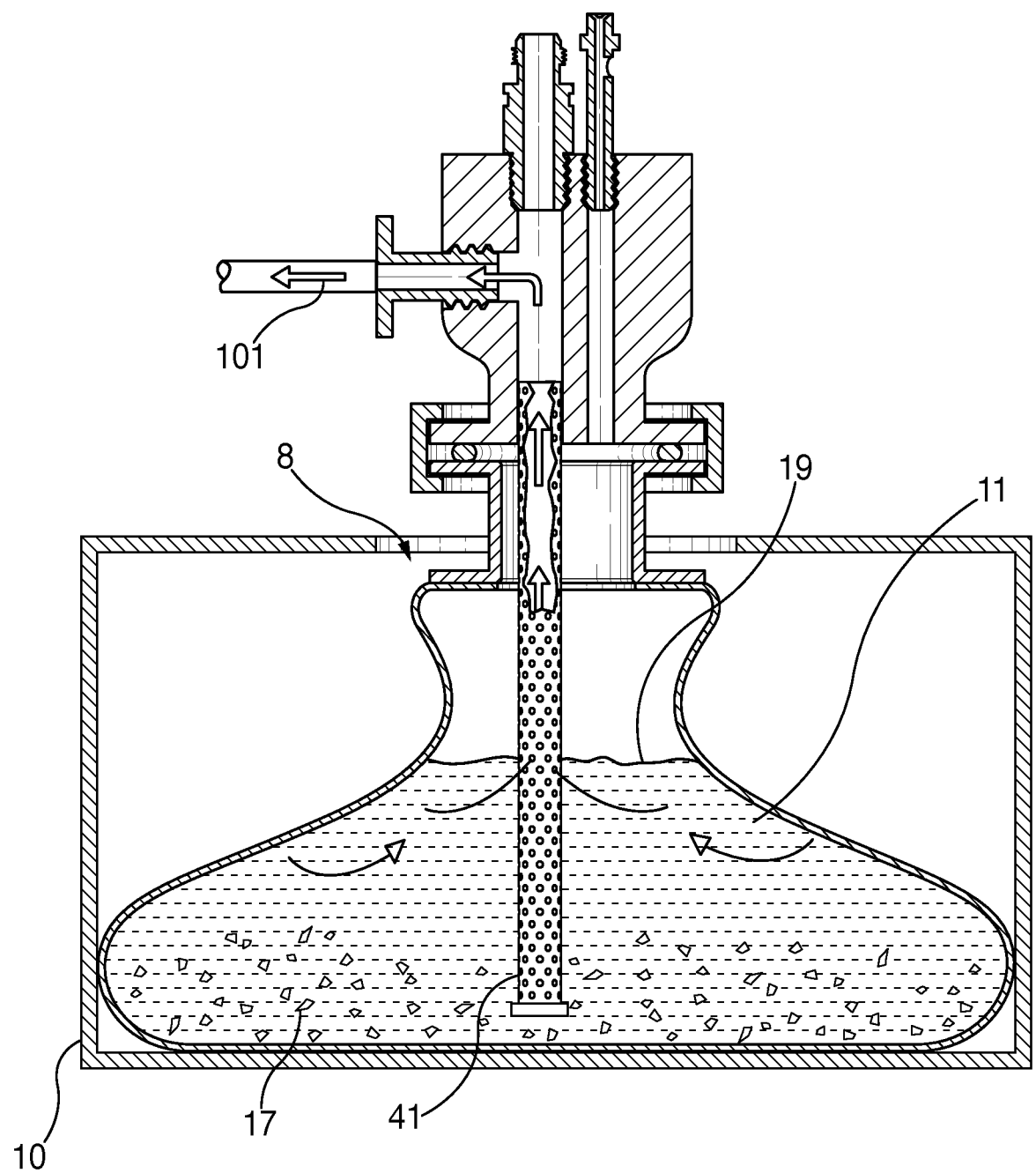

FIG. 3C shows how the bladder 20 collapses around the perforated tube when it is partially empty and the wine may then be drawn out lower in the bladder 20, but always from the upper liquid surface 19 to a point where almost all the wine 11 has been removed and the bladder 20 has almost completely collapsed around the perforated dip tube extension 41. In practice, the clarity of the wine being pumped out may be continuously monitored for clarity in FIGS. 3A-3C. Transfer may be stopped when the turbidity is deemed to be no longer acceptable.

At the stage, the hose may be disconnected from port 42. The clamp 50 may be opened and the dip tube 40 may be removed for wash and reuse. The flexible bladder 20 may be removed from container 10 through opening 8 or other means of egress. The flexible bladder 20 containing any sediments 17 may then be discarded and a new flexible bladder installed for next use.

Figure 4:
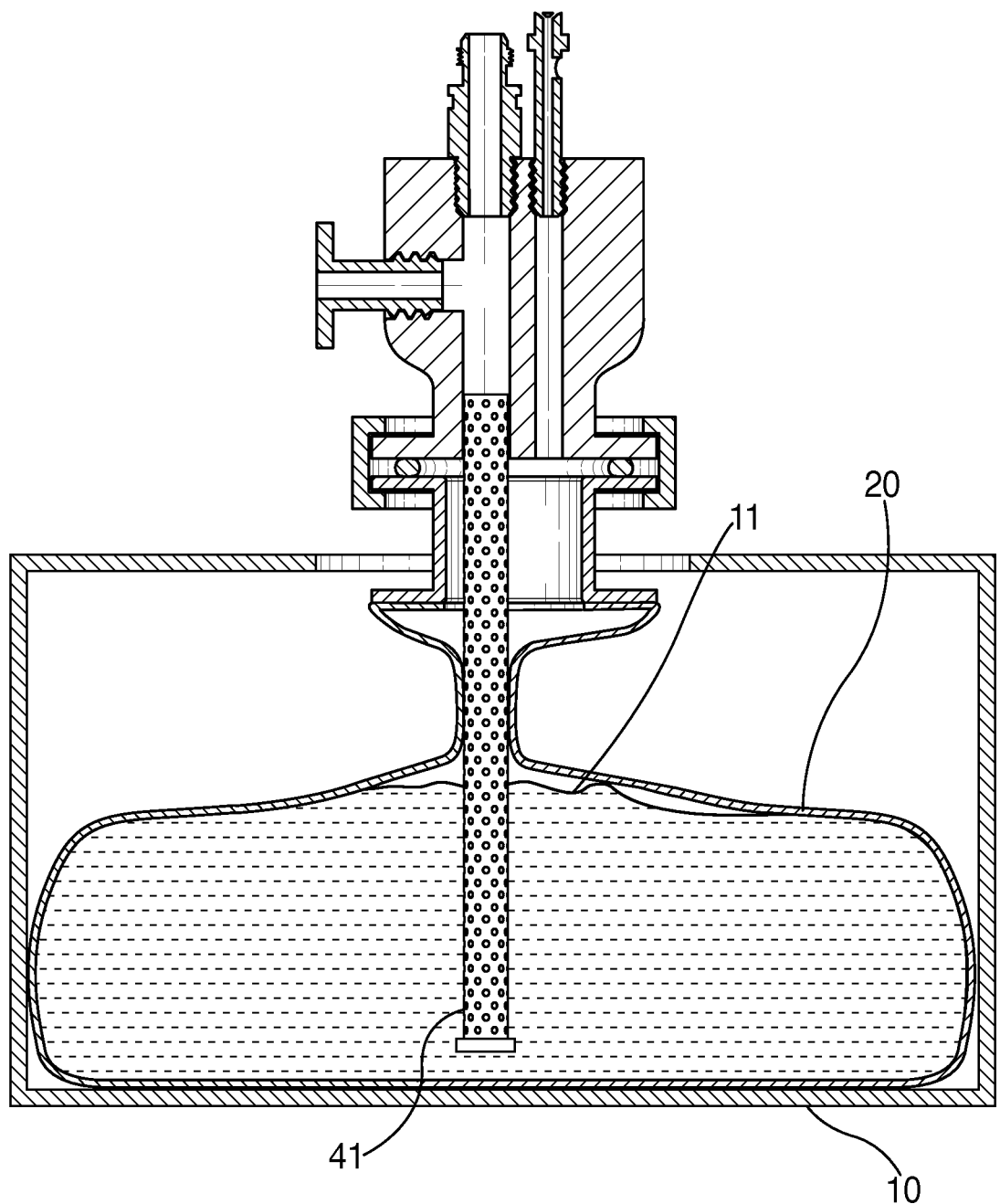
FIG. 4 is a side sectional view showing the invention with a partially full volume.

FIG. 4. shows an embodiment for partially filling wine storage barrels 10. This type of operation is very difficult in conventional rigid containers as the headspace in a partially full rigid container contains air that will rapidly oxidize the contents. Elaborate and expensive gas blanketing system are necessary in these conventional containers. The filling process also requires gas-tight containers and the use of inert gases such as nitrogen or argon. With the disclosed invention, partially filling aging barrels is as simple as filling the flexible bladder 20 with wine 11 to the desired volume and then vacuuming out any entrained air through sampling/vent port 44. The partially filled bladder 20 is now evacuated of air and has minimal headspace 15 to cause oxidation of the wine 11 contained inside. In this manner, wine can be stored for months without risk of oxidation. This feature is of tremendous technical value to small wineries that often have leftover wine amounts that are less than full barrel (typically 59 gallon).

Figure 5:
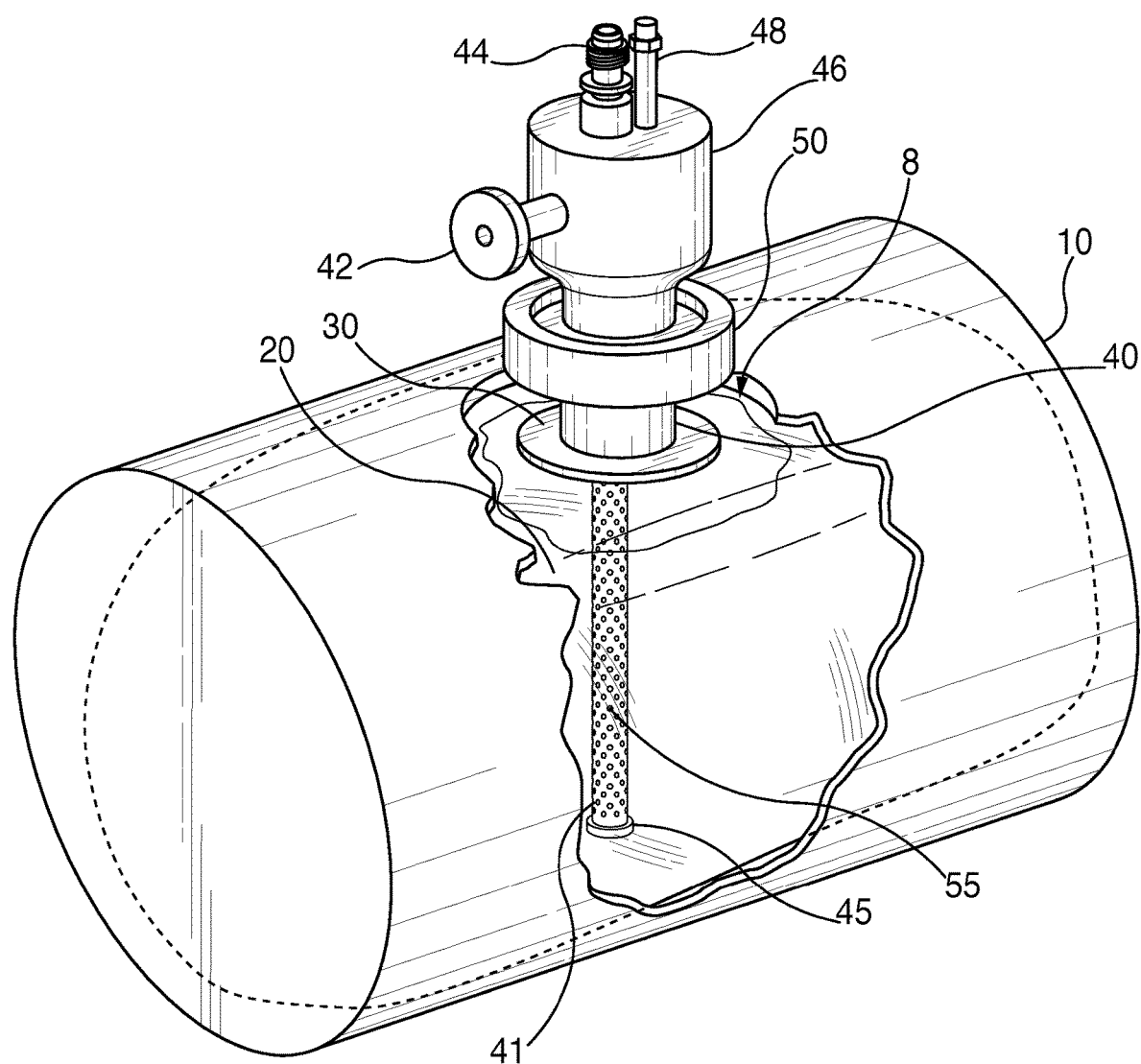
FIG. 5 is a perspective view of at least one disclosed embodiment in a horizontal barrel or drum format.
Figure 6:
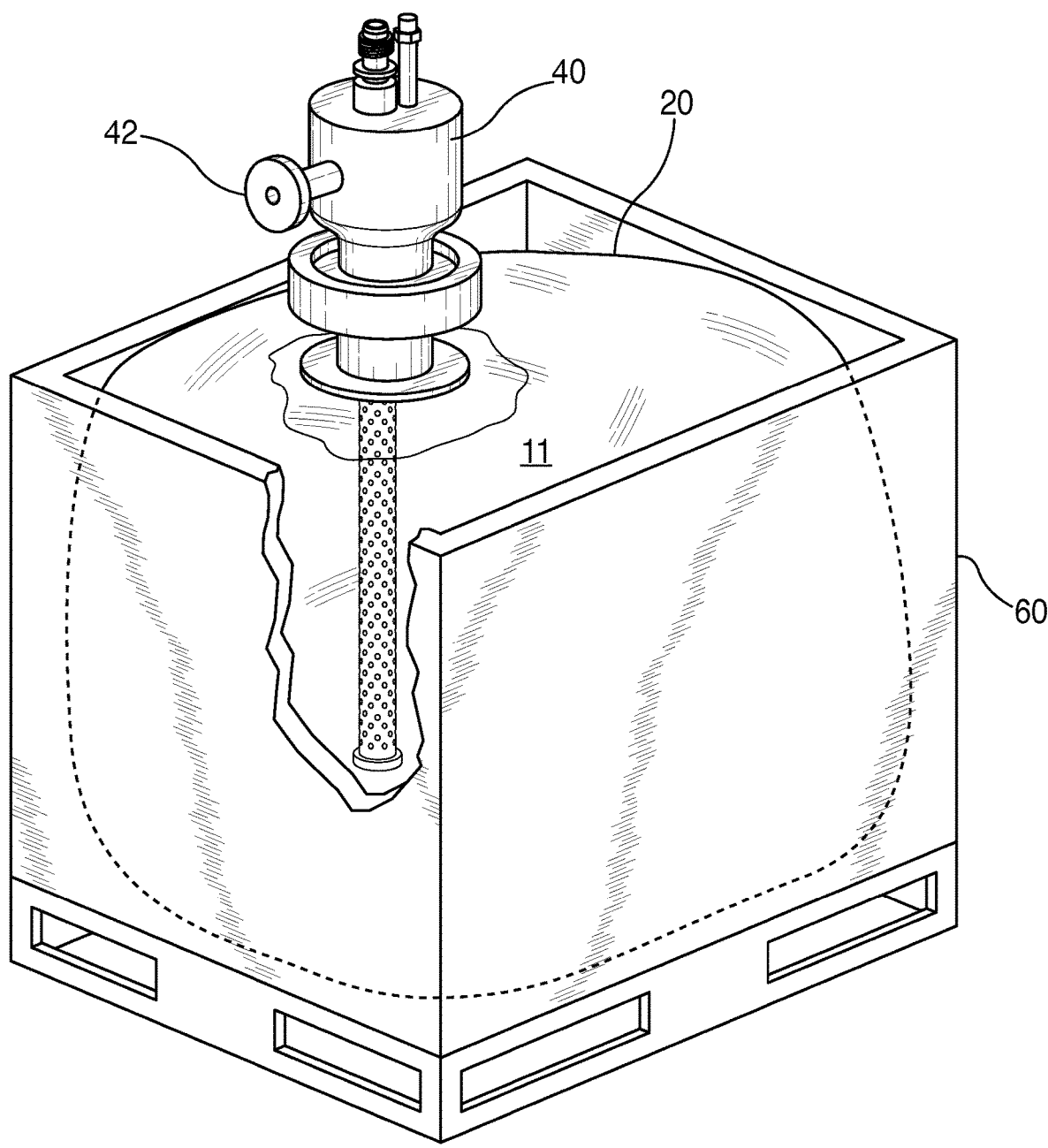
FIG. 6 is a perspective view of at least one disclosed embodiment in a cubic box format.
Figure 7:
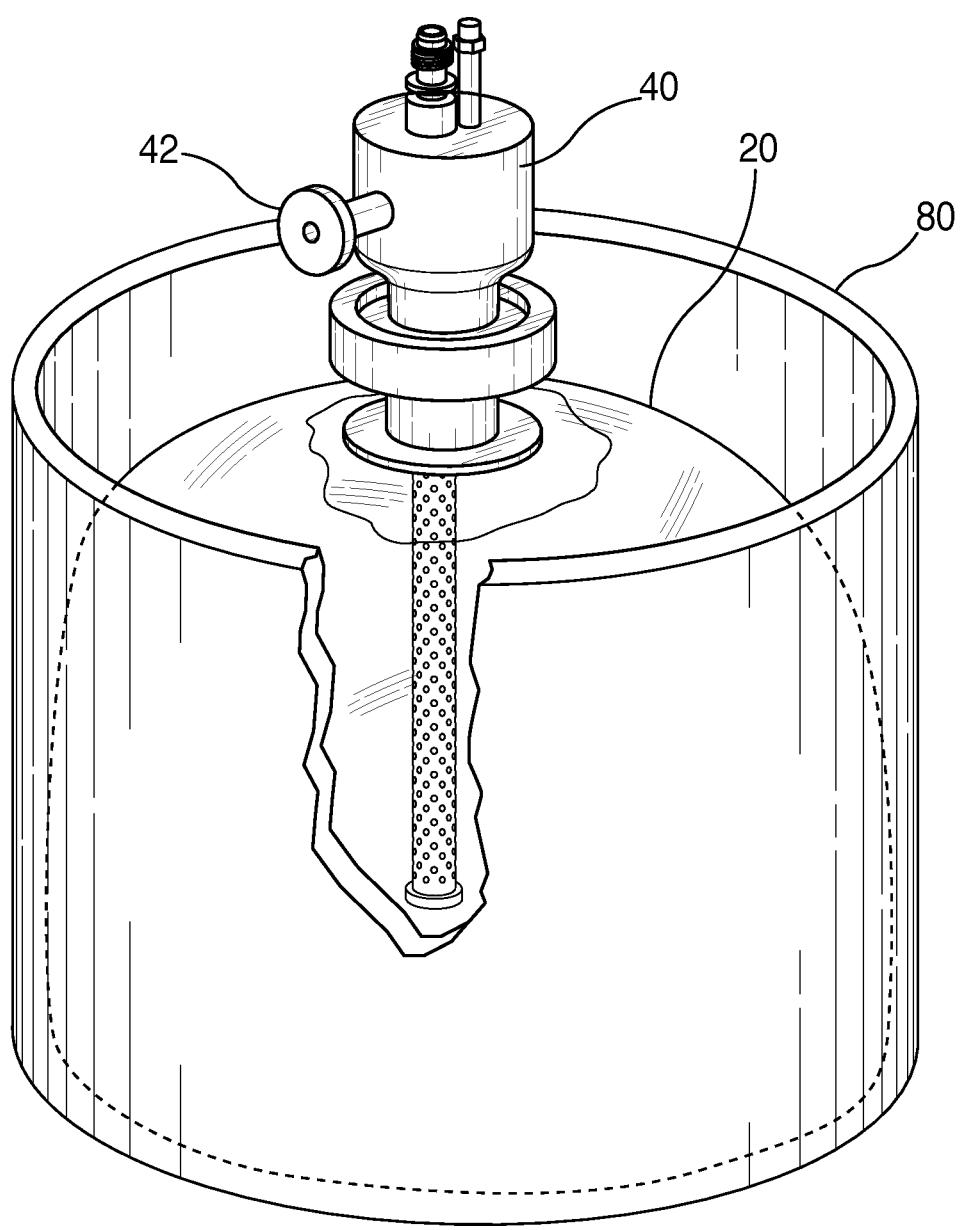
FIG. 7 is a perspective view of at least one disclosed embodiment in vertical cylinder (tank) format.

The flexible bladder 20 and dip tube 40 system can be used in various rigid containers as shown in FIGS. 5-7. FIG. 5 shows an example where the rigid container 10 is a barrel or drum. This type of container is common in wineries and suitable racks/shelving already exists. Unlike conventional barrels, however, the presently disclosed rigid support containers do not contact the wine and they may be made of stainless steel, wood, or any suitably rigid and strong material chosen mainly for aesthetic purposes.

Another container that may be used with the bladder 20 is an intermediate bulk container 60 (IBC). These are conventionally and commonly used for the transport and storage of liquids. FIG. 6 shows an example where the rigid support container 60 is an IBC cubic box. The dip tube 40 may be fitted to a port located on the top of the flexible bladder 20 and may extend to the bottom of the IBC. The bladder may be placed inside the IBC container. All fill and drain operations are possible using the fill/drain port 42 on dip tube 40 described in at least one disclosed embodiment. IBC containers 60 may provide versatility as they can be moved around a winery using forklifts. Since the wine 11 does not contact the IBC container 60 itself, they can be made of cheaper non-food contact materials and they do not need to be washed, saving wash water and labor. The flexible bladder may be discarded after use and the dip tube washed and reused.

Moreover, many IBC containers 60 are certified for truck shipment. Thus, wine in storage may be easily shipped for blending and bottling without the need to be transferred to another container Eliminating these unnecessary transfer operations also reduces the possibility of deleterious air contact resulting in fresher and better quality wine.

As shown in FIG. 7, a vertical open top cylindrical tank 80 may also be used as a rigid support container. This option is technically useful for wineries that have existing vertical metal storage tanks. With at least one disclosed embodiment, a flexible bladder 20 may simply be placed inside an existing vertical open top tank 80. The dip tube 40 may be connected to a port on the top of the flexible bladder and all the benefits of wine storage and aging without air contact may be immediately available. The bladder can be sampled and wine removed without the danger of introducing air into the headspace as would be the case when wine is stored directly inside a rigid tank.

Moreover, there is no need for "topping off". In addition, as the wine now no longer contacts the metal tank walls directly, there is no need to wash the tank between batches. This reduces wash water usage, reduces cleaning labor, eliminates waster waste generation, and yet utilizes the existing installed tankage. The bladders may simply be discarded after each use and the dip tube washed and reused.

Figure 8:
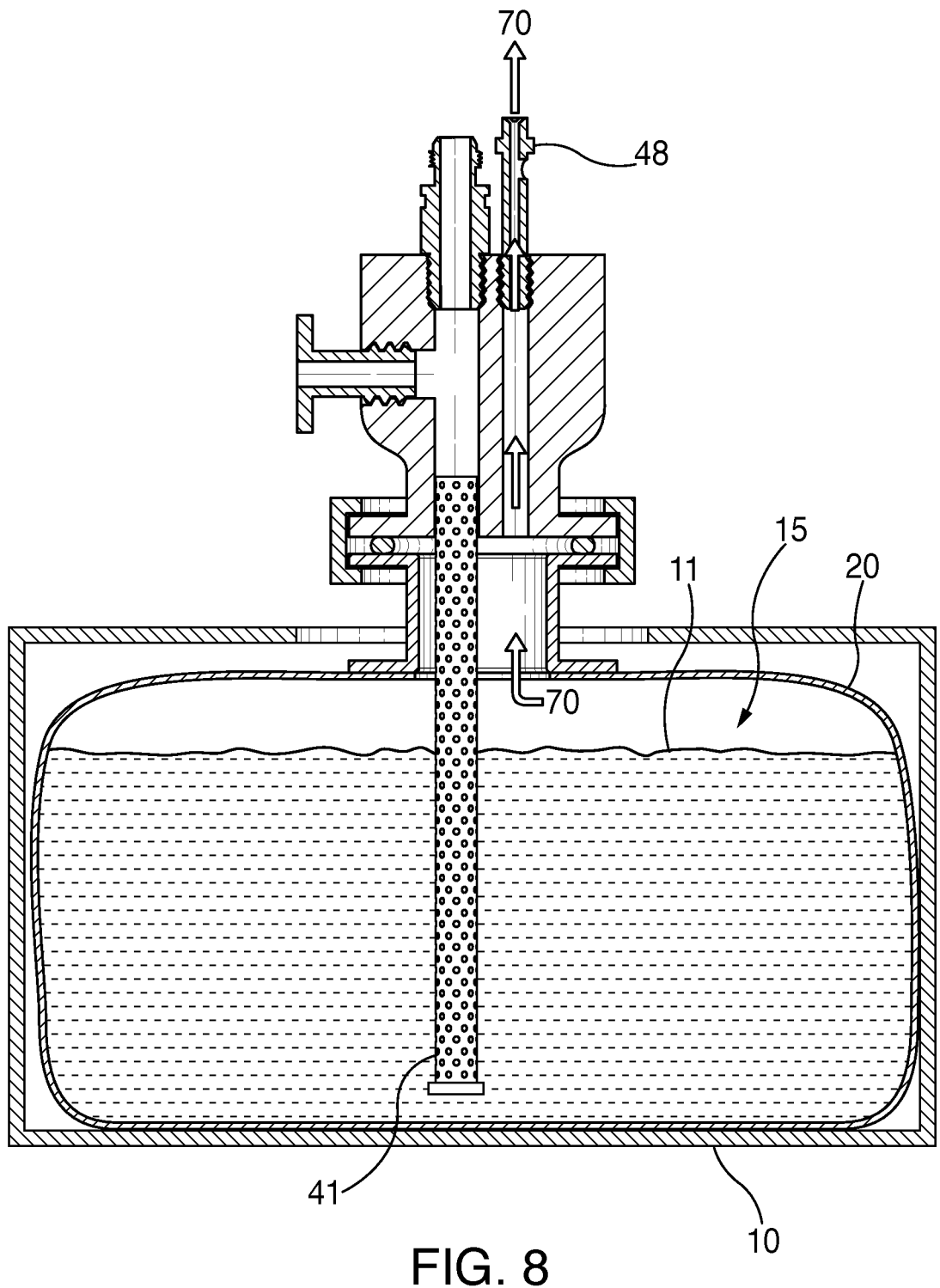
FIG. 8 is a side sectional view of at least one disclosed embodiment showing a pressure relief valve to allow generated gases to vent without the possibility of air entering the bladder.

FIG. 8. is an embodiment of the assembly that can be used in fermentation. In many types of wines, fermentation may continue during storage. This fermentation will generate gases that need to be vented to prevent the bladder 20 from overpressure. In this situation, the pressure relief valve 48 on top of the dip tube 40 enables the ability to allow generated gases 70 to escape from the bladder headspace 15, while prohibiting air from the outside environment to enter the bladder. This ensures that the bladder cannot pressurize to a point of rupture, but also ensures that air cannot enter to deteriorate the wine. The relief valve may be preset to a certain pressure commensurate with the tensile strength of the flexible bladder. A range of 0.5 to 1 psig may be typical.

In some embodiments, aging of wine may include development of a tannic flavor or "oaking." This may be performed by introducing an appropriate type and quantity of wood staves or chips into the bladder. Oaking may easily be terminated when desired by transferring the wine to another bladder not containing wood products.

In accordance with at least one disclosed embodiment, a method of aging wine may include oaking. During oaking, wood products such as staves or chips may be introduced into the bladder. This may be performed by removing the dip tube 40 from the bladder 20 and inserting these products into the opening port 30. The dip tube 40 may then be reattached. This may be done prior to filling or at any later time. The wine may be sampled frequently during the oaking period using sampling/vent port 44. When the winemaker determines that the oaking is complete, the wine can be simply transferred to another bladder that does not contain oak products by pumping out through the fill/drain port 42 of the dip tube 40. The perforations in the dip tube prevent the used oak products from being carried over to the second bladder. By using fresh oak products in each batch, it is possible using the disclosed embodiments to get perfectly or substantially reproducible oaking of each batch of wine. The equivalent oaking characteristics of a cask can be easily determined by computing the ratio of surface area of the staves or chips to the volume of wine in the bladder.

Use of new wood prevents cross-contamination caused by reuse of contaminated previously used wood products. This is a common problem with wooden barrels and leads to substantial losses in wineries worldwide.

Wines are often matured in oak casks as the wood imparts tannic flavors to the wine. These casks are very expensive and can only be used 3-5 times before the wood is no longer effective. At least one disclosed embodiment can produce the same oaking effect in a much more cost effective and reproducible manner as described above using oak staves (wood sections used to make casks). These staves or chips can be made from different wood species and can be toasted differently to provide varying oaking characteristics.

It has been postulated that certain wines require minute levels of oxygenation (microoxygenation) during aging in order to develop characteristic flavors. This is a fine balance, as it is well established that excess oxygen will ruin the wine. In traditional practice, this microoxygenation is the result of oxygen permeating through the wooden casks or barrels typically used for aging. However, these wooden barrels are quite unpredictable in their oxygen permeability and this leads to a hit or miss process.

In at least one disclosed embodiment, all accidental sources of oxygen are minimized and controlled. Oxygen required for micro oxygenation can be introduced in precise and reproducible amounts. This can be done by judicious selection of the material of construction of the flexible bladder. Suitable polymers can be used that can provide over 100 times the oxygen permeability of a typical wood barrel, to others that have essential no oxygen permeability. Since the only ingress of oxygen is through the flexible bladder, this is a reproducible and inexpensive method. It requires no additional hardware or particular attention by the user.

Accordingly, wine can be transferred to different bladders to change the microoxygenation environment when desired. For example, typically, young wine starts in a high microoxygenation environment to stabilize the tannins. Then it is moved to a very low microoxygenation environment for long term storage. All this can be done by selecting specified flexible bladders with known oxygen characteristics and pumping the wine from and to the appropriate bladders.

Although described with respect to containing wine, the bladder and dip tube system may be used with any fluid that is desired to be kept in an oxygen-controlled environment. Though the disclosed embodiment has been described by way of a detailed description in which various embodiments and aspects of the invention have been described, it will be seen by one skilled in the art that the full scope of the invention is not limited to the examples presented herein.

The invention claimed is:

1. A system for dispensing and storing liquid comprising:
    a flexible bladder for holding a liquid and a sediment that settles out of the liquid;
    a dip tube head component coupled to the flexible bladder in an airtight manner so that the liquid is held in the bladder in an airtight manner; and
    means for dispensing the liquid from the flexible bladder by dispensing a portion of the liquid from an upper surface of the liquid in the bladder before portions of the liquid below the portion of the liquid from the upper surface so that the liquid at the upper surface is dispensed prior to portions of the liquid below that portion throughout a dispensing process, wherein the liquid without the settled sediment is dispensed from the device,
    wherein the means for dispensing the liquid comprises a perforated dip tube extension coupled to the dip tube head component and configured to extend into the flexible bladder to a bottom wall of the bladder,
    wherein the dip tube head component comprises a fill/drain port and a sample port in direct communication with the perforated dip tube extension via a chamber formed in the dip tube head component, and
    wherein the perforated dip tube extension further comprises a solid end cap configured to close a distal end of the perforated dip tube extension and prevent liquid and sediment from entering the distal end of the perforated dip tube extension.

2. The system of claim 1, wherein the perforated dip tube extension has a length and the perforations cover the entire length of the perforated dip tube extension.

3. The device of claim 1, wherein the dip tube head component comprises a fluid relief valve extending from a top surface of the dip tube head component and in a pathway in communication with the liquid in the flexible bladder separated from the chamber by a wall of the dip tube head component.

4. The device of claim 1, wherein the dip tube head component comprises a flange and the bladder comprises a mating connector, wherein the dip tube head component flange and the mating connector are joined via a gasket and a clamp to form an airtight connection.

5. The device of claim 1, wherein the bladder comprises a molded connection port for coupling with the dip tube head component and through which the means for dispensing liquid extends.

6. A device for regulating liquid stored in a container by filling, draining, or maintaining an airtight environment, the device comprising:
    a dip tube having
    a head component configured to couple to a container in an airtight manner wherein the head component has a plurality of ports,
    a perforated dip tube extension, coupled to and extending from one end of the head component configured to extend away from the head component and into the container, and
    a solid end cap configured to close the distal end of the perforated dip tube extension and prevent contents of the container from entering the distal end of the perforated dip tube extension,
    wherein the perforated dip tube extension is defined by a length and perforations extend along the perforated dip tube extension the entire length,
    wherein the head component comprises a pressure relief valve extending from a top surface of the dip tube head component to a port in the container and in a pathway in the head component separated from the dip tube by a wall of the head component.

7. The device of claim 6, wherein the head component comprises two one-way valve ports coupled to and extending from another end of the head component, wherein one of the valve ports comprises a pressure relief valve and a second of the valve ports comprises a sample port in fluid communication with the perforated extension tube extension.

8. The device of claim 7, wherein the head component further comprises a drain/fill port in fluid communication with each of the sample port and the perforated dip tube extension via a chamber formed in the head component.

9. The device of claim 6, wherein the head component terminates in a flange extending radially relative to a length of the perforated dip tube extension for coupling with the container.

10. A method for draining liquid from an airtight bladder containing a liquid and a sediment, the method comprising:
   connecting a hose and pump to a fill/drain port of a dip tube, which is coupled in an airtight manner to a bladder containing a liquid and a sediment,
   opening the fill/drain port and withdrawing the liquid so that an upper surface layer of the liquid is withdrawn before lower fluid from a start of the withdrawal until a stop of the withdrawal of the liquid in the bladder through the fill/drain port via perforations formed in the dip tube along an entire length of the dip tube, and
   stopping the pump when turbidity in the hose reaches a predefined threshold.

11. The method of claim 10, wherein the perforations in the dip tube are formed in a perforated dip tube extension and the perforated dip tube extension has a solid cap formed on an end opposite the fill/drain port.

12. The method of claim 10, wherein prior to connecting a hose and pump, the airtight bladder, the airtight bladder is filled with liquid so that no air headspace is present in the airtight bladder.

* * * * *